United States Patent
Tresser (10) Patent No.: US 7,225,169 B1
(45) Date of Patent: May 29, 2007

(54) METHOD AND SYSTEM FOR COMMERCE WITH FULL ANONYMITY

(75) Inventor: Charles Philippe Tresser, Mamaroneck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/578,474

(22) Filed: May 26, 2000

(51) Int. Cl.
*H04L 9/00* (2006.01)
(52) U.S. Cl. .......................... 705/74; 705/75
(58) Field of Classification Search ............ 705/74, 705/75, 4, 41, 44, 26, 37–39, 78, 79
See application file for complete search history.

(56) References Cited

U.S. PATENT DOCUMENTS

| | | | | |
|---|---|---|---|---|
| 5,420,926 A | * | 5/1995 | Low et al. ............... | 705/74 |
| 5,604,802 A | * | 2/1997 | Holloway ................ | 380/280 |
| 5,721,780 A | * | 2/1998 | Ensor et al. ............. | 713/155 |
| 5,901,229 A | * | 5/1999 | Fujisaki et al. .......... | 380/30 |
| 5,961,593 A | * | 10/1999 | Gabber et al. ........... | 370/329 |
| 5,991,623 A | * | 11/1999 | Ohta et al. .............. | 455/435.1 |
| 6,327,578 B1 | * | 12/2001 | Linehan .................. | 705/65 |
| 6,453,301 B1 | * | 9/2002 | Niwa ..................... | 705/26 |
| 6,539,093 B1 | * | 3/2003 | Asad et al. .............. | 380/279 |
| 2001/0037281 A1 | * | 11/2001 | French et al. ........... | 705/37 |
| 2001/0037316 A1 | * | 11/2001 | Shiloh .................... | 705/74 |
| 2002/0046064 A1 | * | 4/2002 | Maury et al. ........... | 705/4 |
| 2002/0065758 A1 | * | 5/2002 | Henley ................... | 705/37 |

FOREIGN PATENT DOCUMENTS

| | | | |
|---|---|---|---|
| JP | 08-111679 | | 4/1996 |
| JP | 10-021302 | | 1/1998 |
| JP | 10021302 | * | 1/1998 |
| JP | 10-074221 | * | 3/1998 |
| JP | 11-154184 | | 6/1999 |
| JP | 11-259616 | | 9/1999 |
| JP | 2002157423 | * | 5/2002 |

* cited by examiner

*Primary Examiner*—Pierre Eddy Elisca
(74) *Attorney, Agent, or Firm*—Stephen C. Kaufman, Esq.; McGinn IP Law Group, PLLC (57) ABSTRACT

A method (and system) of conducting business electronically between a first party and a second party, includes providing a third party who knows the identity of the first party but no privacy-compromising information regarding a proposed electronic business transaction between the first and second parties, and conducting the electronic business transaction between the first and second parties through the third party such that the identity of the first party is kept from the second party.

14 Claims, 4 Drawing Sheets

METHOD AND SYSTEM FOR COMMERCE WITH FULL ANONYMITY

BACKGROUND OF THE INVENTION

1. Field of the Invention

The present invention relates to a method and system for performing commerce, and more preferably to a method and system for performing electronic commerce (i.e., "e-commerce") with full anonymity for the participants.

2. Description of the Related Art

Recently, rapid development of electronic commerce over the Internet has occurred. However, a perceived problem of this new type of commerce is that many consumers are still afraid of the lack of privacy protection to which one is exposed by using electronic commerce and other usage of the Internet.

However, in reality, several policies and technologies exist which allow to use the benefits of electronic commerce with complete protection of privacy and even complete anonymity. For instance, protocols for anonymously buying solid goods and electronic goods have been disclosed respectively in U.S. patent application No. 09/129,826, filed on Aug. 5, 1998, entitled "Method and apparatus for remote commerce with customer anonymity", by M. Shub et al., and in U.S. patent application No. 09/569,068 filed on May 11, 2000, entitled "Achieving Buyer-Seller Anonymity for Unsophisticated Users Under Collusion Amongst Intermediaries" by P. Dubey et al. However, despite these advances in security, there is still a perceived lack of privacy and security in performing e-commerce by a wide majority of potential users.

Further, previously, in the context of regular contact between a commercial organization and a customer, where the nature of the transaction heavily depends on some collection of data associated to/with the customer, such as the precise contract, past information, information about the transaction being made, etc., conventional methods forced the data to be attached to the identity of the customer (e.g., the word "forced" should be understood as "forced up to unbearable duress").

With the development of Information Technology, such data were first input in a computer system for better handling and processing of the transaction. A next stage of development of Information Technology allowed making heavier use of the computer, in particular for data mining, to better evaluate the risk associated to each customer, to evaluate the risk of portfolios, to perform customer segmentation for different purposes (commercial and marketing strategy, pricing, etc.), and other aspects of business intelligence and use of advanced analytics.

However, using such a method of business intelligence has arguably been a first serious blow to customer privacy, just because business intelligence allows a company to learn more about their customers than what the customers have willingly (or knowingly) approved.

Because business intelligence has become so precious, both for marketing and related functions, and for customer relationship management purposes, some companies have used data about their customers as an asset that they would sell to other companies. This has been another serious breach to customer privacy.

While trying to limit privacy violations, and even trying to restore fuller privacy than was ever possible before the beginning of modern Information Technology, it is still desirable to achieve this goal without compromising the analytic tools which have allowed better customer understanding and thereby better pricing. Otherwise, without these tools being available to the relevant industry and marketers, the customer would have to pay for the price of reduced commercial efficiency.

SUMMARY OF THE INVENTION

In view of the foregoing and other problems of the conventional methods and structures, an object of the present invention is to provide a method and structure in which potential customers perceive an increased privacy and security associated with e-commerce.

Another object of the present invention is to provide businesses with some level of business intelligence (e.g., for marketing and related functions and for customer relationship management) surrounding a transaction, without compromising the analytic tools which have allowed better customer understanding and thereby better pricing, better customer service, better customer retention, etc.

In a first aspect, a method (and system) of conducting business electronically between a first party and a second party, includes providing a third party who knows the identity of the first party but no privacy-compromising information regarding a proposed electronic business transaction between the first and second parties, conducting the electronic business transaction between the first and second parties through the third party such that the identity of the first party is kept from the second party.

In a second aspect, a method (and system) of performing electronic commerce without a candidate customer being forced to disclose private data together with an identity of the candidate customer to a business entity requiring the private data, the method includes establishing an intermediary relationship with a third party between the candidate customer and the business entity, providing a proprietary item to the customer such that the customer can be identified as a legitimate owner of the item without revealing the identity of the customer, and performing electronic commerce between the customer and the business entity through the third party, utilizing the proprietary item, such that an identity of the customer is kept from the business entity.

In a third aspect, a program storage device is provided for storing the method of the invention.

As described below, the present invention will be presented in an exemplary embodiment in the very important (and particularly difficult) case of the insurance industry, and more precisely for auto insurance and health insurance (which would readily adapt to the simpler case of life insurance). Obviously, the present invention is not limited to this embodiment or environment, and thus, as should be readily evident to anyone of ordinary skill in the art taking the present application as a whole, the insurance scenario is presented only for ease of illustration and understanding for the reader.

The concerns for privacy in business insurance are far more limited, and business insurance comes in a variety of categories which must be properly analyzed for relevant solutions to be offered.

The present invention will be presented in two portions with increasing complexity:

the first portion only concerns tentative registration, prize checking etc. (this portion may be the stage where the customer expects higher privacy as several candidate companies can be contacted before a business entity (an insurance provider) will be chosen); and the second portion concerns the further relation between the business entity (e.g., insurance entity) and the customer.

Each portion can be used independently of whether the other portion is used. Moreover, these portions can be used independently of each other, by performing trivial modification to what is presented here.

A key ingredient of the present invention is a Third Party T which will serve as intermediary between the customer and the business entity (i.e., insurance company). A customer C will establish a relationship with T which will serve for all further engagements with insurance companies.

A Fourth Party F will also be involved which delivers to customer C some mode of identification which does not reveal the identity of C, preferably in a way which respects the privacy of C as much as possible. For instance, F may deliver to C a portable device P(C) which carries the biometrics of C in such a way that C can identify him or herself as the legitimate owner of P(C) without revealing his or her identity according to the methods described in U.S. patent application No. 09/372,170, filed on Aug. 11, 1999, entitled "Biometrics with no privacy invasion" having IBM Docket number YO998-529 by Timothy Chainer et al. and hereafter referred to as "Ref1", incorporated herein by reference. The non-duplicability and authenticity of P(C) can for instance be guaranteed using the methods disclosed in U.S. patent application No. 09/397,503, filed on Sep. 17, 1999, entitled "Duplication and imitation resistant identifying marks on objects and duplication and imitation resistant objects such as smart cards", having IBM Docket No. YO999-129 by Gaurav Aggarwal et al., incorporated herein by reference, and hereafter referred to as "Ref2".

The device P(C) delivers a serial number S(C) at each transaction, and S(C) can be read off P(C) only in the presence of customer C. For more privacy, it would be better that P(C) generates numbers S(C,n), where n is an integer belonging to a large set $\{1, 2, \ldots, N\}$. Then, for each new insurance company and or other partner of customer C, a new number n is chosen as a starting number for all further transaction(s) between the two parties. In particular, if C quits insurance entity I for another company and comes back to I, it can change the n associated to I. For simplicity, the use of this number n will be omitted in the sequel, as using it is a trivial amelioration of the overall protocol.

The insurance entity I will also choose a large set of verifiers Vj, j=1, 2, . . . which will be medical practitioners for health (or life) insurance, and garages in the case of automobile insurance. Any verifier will be equipped with the apparatus needed to verify portable devices as described above, and will be connected to the Internet so that they can send information to third party T. The relation with T can be performed using a privacy protection mechanism, involving several other parties to avoid possible collusion, as described for instance in the home page of the NetBill Security and Transaction Protocol by B. Cox, J. D. Tygar, an M. Sirbu which can be obtained on the Internet at www.ini.cmu.edu/netbill: see the paper "Maintaining privacy in electronic transactions" by Benjamin T. H. Fox. These are referred to collectively as "Ref3".

When deciding to register with insurance I, customer C sends to T an application A. This application can be taken off, for example, the world-wide-web (WWW) page of the business (insurance) entity I, together with a piece of software SOFT, such as a JAVA applet, which allows encryption using pu1(I) where (Pr1(I),pu1(I)) is the public signature scheme of I. SOFT also allows customer C to compute a public signature scheme (Pr2(I,C),pu2(I,C)). C will communicate pu2(I,C) together with her/his application, or other form of first contact through T. As pu2(I,C) is the public part of a public encryption scheme, there is very limited risk in T knowing that key. For improved security, pu2(I,C) can be encrypted using pu1(I) before being communicated to I through T.

The application A has a header H where all identification data about customer C will be written in clear (more precisely, in a manner understandable to T, but that may involve some encryption scheme that T uses to communicate with customers) together with S(C), and a body B where all personal or vehicle data of customer C and pu2(I,C) will be written after encryption using pu1(I).

When receiving the application, third party T cuts off the header and replaces it with a number N(T,C,I) which is sent to insurance entity I with body B of the filled application A. Insurance entity I can then decrypt body B and decide on the level of risk and the price if the level of risk is acceptable. These decisions D will then be communicated to insurance entity I after encryption using pu2(I,C) together with N(T,C,I), and I can then send pu2(I,C)(D) to C.

If needed, before sending application A to insurance entity I, customer C will have visited one or more verifiers Vj. C identifies him or herself to each verifier Vj it visits using S(C), and asks Vj to send S(C) to I, together with relevant data verified by Vj such as:

the data relevant to an automobile identified with a tab as described, for example, in U.S. patent application No. 09/213,179, filed on Dec. 17, 1998, entitled "Methods and Embodiments to Authenticate Objects", having IBM Docket No. YO998-295, to Timothy Chainer et al, incorporated herein by reference, and hereafter referred to as "Ref4", health data associated to C identified by S(C), which number Vj reads off P(C).

This communication to insurance entity I will be performed by appending to S(C) the relevant data encrypted using pu1(I), or some other key system common to all verifiers but possibly distinct from the key system devoted to interactions with candidate customers.

In several cases, and in particular for auto insurance, aspects of the past (history) of customer C, such as driver records, possible convictions, etc. are important elements of the risk evaluation. Either Government agencies such as the Department of Motor Vehicles (DMV) accept to be equipped as private verifiers, or third party T may ask services of some special verifier(s) whose task will be to serve as intermediaries with the official partners and associate data encoded with pu1(I) to tags such as S(C), that third party T would then transmit to insurance entity I.

The link between third party T and insurance entity I can make more secure by using the methods of Ref3 or by making it indirect in the following way. T will post all filled applications on a dedicated world-wide-web (WWW) page after cutting off clear identification thereof, and tagging by a number N(T,C,I) which has redundancies allowing insurance entity I, but no other party, to recognize this number as a number emitted by insurance entity I. All Insurance Companies can then check for the folders so posted and will capture those using their public key.

Communication back to insurance entity I can similarly be performed using such a WWW page, or using the methods described in Ref3.

Payments from insurance entity I to third party T or vice-versa must be documented by the paying party. This can be done by attaching a tagging number to the payment. This tag is communicated to the bank of the paying party, and accompanies the transaction order to the bank of the payee. The paying bank accepts the money transfer in exchange of the tag coded using a private key of the payee's bank. Such practices, or more sophisticated ones with at least similar virtues, are well known and are indicated here only for the sake of completeness.

Turning now to the case when the relation between customer C and insurance entity I has been established, so that C is a customer of insurance entity I, it will be described how insurance entity I can deal with customer C despite ignoring who customer C is (i.e., C's identity).

In typical operations, the infrastructure described above for first contacts type of interactions allows to get all tasks done. When submitting a claim, customer C will address it to T, possibly after consulting with one or more verifiers Vj as needed.

After processing the claim, which is obtained by insurance entity I from T by the same method that the original application was obtained, insurance entity I will send a payment, or a request for further data, or the declination of the claim (all encrypted using pu2(I,C)), to T. Third party T will then transmit it to customer C. Anybody versed in the art would readily understand how this can be done while the nature of what C receives remains unknown from T, while insurance entity I cannot access the identity of C.

The only problem not addressed thus far is the occurrence of some refusal by customer C in the way insurance entity I handles the claim.

This problem will be solved in stages, depending on the severity of the refusal. In the first stage, which involves reevaluation of data, the anonymity can be preserved as identification of individuals is made using S(C) and identification of interest items (i.e., vehicles in the scenario of car insurance) is based on tag recognition.

In the second stage where the judicial system must be involved, the anonymity is expected to be abandoned, except in judicial systems where courts accept to hear anonymous cases presented by anonymous parties. In the latter cases, the anonymity will be preserved until the end (disposition of the case), using S(C) and recourse to third party T (for instance) for the payment.

As usual when using keys, it is preferable that keys be changed over time. Some businesses such as Equifax, take care of such an aspect of cryptography-heavy transactions as a professional service.

Thus, with the unique and unobvious features of the invention, a method and system are provided in which potential customers perceive an increased security associated with e-commerce.

Further, even with such increased privacy/security, businesses are still provided with some level of business intelligence (e.g., for marketing and related functions and for customer relationship management) surrounding a transaction. Thus, the analytic tools which have allowed better customer understanding and thereby better pricing, will continue to be advantageously used.

Hence, customers can conduct electronic business with a company without the company knowing the customer's identity, but in a manner that allows the company to use business intelligence methods to improve its performance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Turning to FIGS. 1–6, a first preferred embodiment of the invention will be described hereinbelow.

However, prior to discussing the preferred embodiment, it is noted that generally, the present invention goes beyond the conventional privacy providing technology in the electronic commerce arena in at least two respects.

First, the present invention capitalizes on new developments of the Information Technology to allow for increased privacy protection, up to anonymity, in domains of commerce previously depending on Information Technology to collect and manipulate data, but previously not depending on sales and transactions over the Internet.

Secondly, the invention allows for accrued privacy protection to be achieved without significantly compromising new important tools of commerce such as business intelligence, including customer segmentation and other applications of data mining.

Prior to a detailed discussion of the present invention, some concepts and tools from modern cryptography will be briefly described.

More precisely, secret key cryptography, as well as private key/public key pairs (in the form of public encryption schemes or of public digital signature schemes) and secure hash functions (such as the Secure Hash Algorithm (SHA-1)) will be used in the present invention. The use of secret key cryptography, of private key/public key pairs, and of secure hash functions are now well known. A description of these techniques and various implementations can be found in "Handbook of applied Cryptography", by Alfred J. Menezes, Paul C. van Oorschot and Scott A. Vanstone, CRC Press, 1997 and in "Cryptography, Theory and Practice" by Douglas R. Stinson, CRC Press, 1995.

For definiteness, each time a private encryption scheme is used, one can choose the RSA protocol, described in U.S. Pat. No. 4,405,829, as a method to generate and use a SK/PK pair in order to allow for public encryption. Several other methods could also be used such ad elliptic curves (see, e.g., the "Handbook of Applied Cryptography" and "Cryptography, Theory and Practice", both cited above).

In the description of the invention, a document is referred to as "encrypted" or "digitally signed" using, for instance, some private key. It is indeed assumed that the document is interpreted as a number to which cryptographic methods can readily be applied. If the corresponding number is too long, as usual one can use a hash function to reduce the information, and/or cut the number into smaller components and then encrypt or sign the reduced information or components. The hash function which is used will be made publicly known if public key cryptography is to be used. These are all practices well known in the art, which need no further description.

Besides such well known techniques from cryptography, the present invention also advantageously uses recent inventions, whose functionality will now be described.

In Ref1, methods were disclosed which allow to carry aspects of the biometrics of a person on a portable device, and utilize these data to identify securely the carrier as the legitimate owner of the devise without compromising the biometrics of this individual. This can trivially be adapted so that furthermore the identity of the carrier needs not be revealed.

In Ref4, methods were disclosed to attach a tag to an automobile so that the vehicle is securely identified by such tag, which can be read either by contact or contact-less methods, depending on the precise choice of technology. Again, this can be easily adapted so that the identification process securely attaches the vehicle (or more generally some object such as an art piece for instance) to the tag without revealing further identification of the object such as who is the owner, what are the numbers identifying legally the object, etc. Further, Ref4 also describes how one can take photographs of these objects with guarantee that the legitimate object is on the picture, and the picture has not been modified and is a trusted representation of reality.

The problem of finding protocols and commercial models which allow communication on the Internet with complete anonymity has received several solutions. One example is given in Ref3.

In Ref2, a method is provided to make objects such as smart cards and other portable devices essentially impossible to counterfeit or duplicate.

Several other methods exist with different levels of success in achieving the goals of the above-mentioned references (Ref1, Ref2, Ref4). Any such method, if judged safe enough, could be used instead of the examples given above. The examples are given here merely to support the overall feasibility of the present invention.

Thus, generally, a triangular relationship in electronic commerce is provided by the present invention between customer, a third party who knows the customer's identity but not anything about the transaction and the personal data of the customer, and the business entity which knows everything but the customer's identity.

Preferred Embodiments for Purveyor Choice

Preferred embodiments for the first portion of the present invention, that concerns the process of choosing a purveyor of good or services (e.g., the example of insurance is provided as it is more complex than several other business, including most forms of retail) will be described now.

First, it is assumed that some number of firms are available as Third Party T as described above, and design by T the one customer C has chosen.

Similarly, it is assumed that some number of firms are available as Fourth Party F as described above, and design by F the one customer C has chosen, and by P(C) the portable device as described in Ref1 that Fourth Party F delivers to customer C. It is noted that, as mentioned above, the device P(C) delivers a serial number S(C) at each transaction, and S(C) can be read off P(C) only in the presence of the customer C. It is also noted that other methods of identification of the customer that do not reveal her/his identity can alternatively be used, which do not have the sophistication of the use of a device such as P(C). For instance, one can use a card which carries a password which cannot be read without special equipment. The card can also (or instead) carry a picture of C (a rudimentary form of biometric indeed).

As described above, the insurance entity I will also choose a large set of verifiers Vj, j=1, 2, . . . which will be medical practices for health (or life) insurance, and garages in the case of automobile insurance, which can be linked to insurance entity I in an anonymous way as described.

Figure 1:
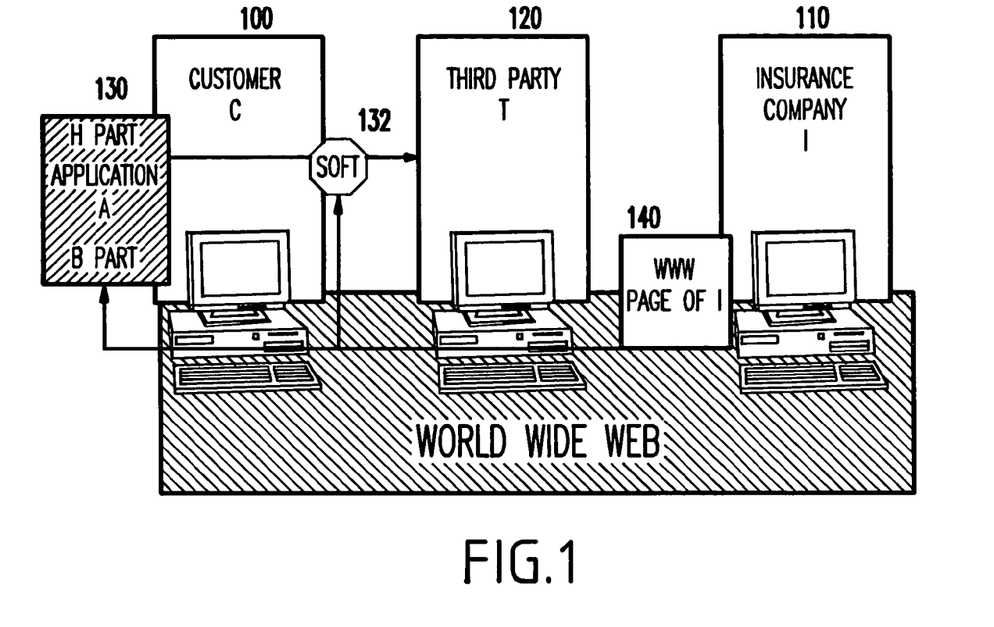
FIG. 1 schematically illustrates an environment of the system according to the present invention.

Referring now to FIG. 1, when deciding to register with insurance I at 110, customer C at 100 sends to third party T (120) an application A (130). This application A is taken from the WWW page 140 of insurance entity I, together with a piece of software SOFT (132), such as a JAVA applet, which allows encrypting the application using pu1(I), where (Pr1(I),pu1(I)) is the public signature scheme of insurance entity I. SOFT 132 also allows customer C to compute a public signature scheme (Pr2(I,C),pu2(I,C)).

Figure 2:
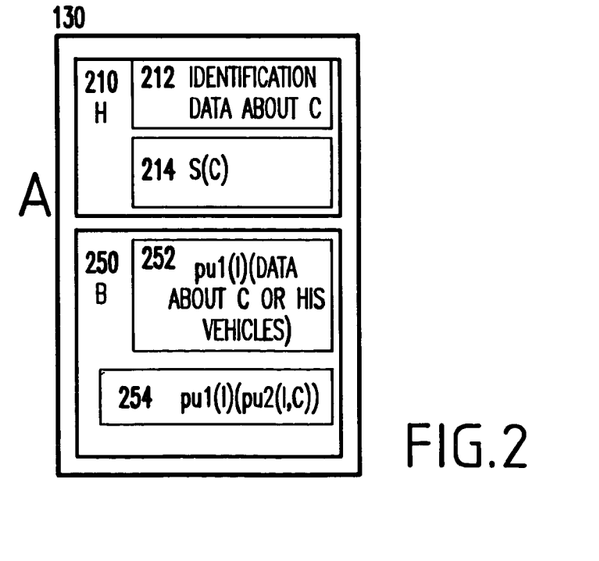
FIG. 2 schematically illustrates an application 130 of a customer (C) 100.

Referring now to FIG. 2, the application A (130) has a header H 210 where all identification data about customer C (100) will be written in the clear (i.e., without encryption) at portion 212 together with S(C) at portion 214, and a body B (250) where all personal or vehicle data of customer C DATA (252) and pu2(I,C) at portion 254 will be written after encryption using the public key pu1(I).

Figure 3:
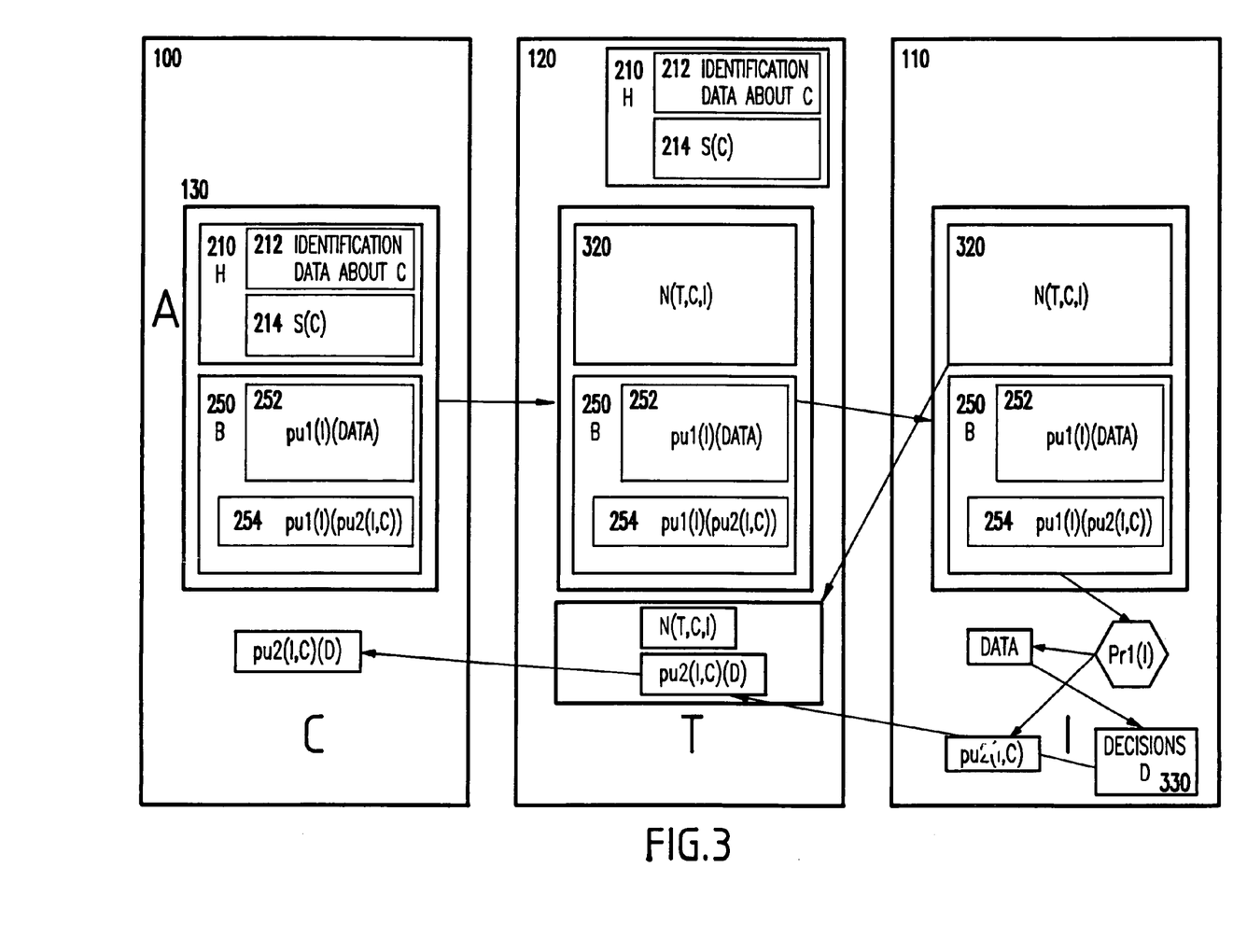
FIG. 3 schematically illustrates a processing flow of the application A between a customer (C) 100, insurance entity (I) 110, and a third party (T) 120, and more specifically a preferred embodiment for making a choice of purveyors.

Referring now to FIG. 3, when receiving the application A 130, third party T 120 cuts off header H 210 and replaces it with a number N(T,C,I) at 320 which is sent to insurance I 110 with the filled-out body B (250) of application A 130.

Then, insurance entity I decrypts body B using Pr1(I)(pu1 (DATA)) and decides on the level of risk, and determines the price if the level of risk is acceptable. Then, these decisions D 330 are communicated by insurance entity I to third party after encryption using public key pu2(I,C) together with the number N(T,C,I). Then, the third party T, using the number N(T,C,I) to recognize customer C, sends the publicly encrypted document pu2(I,C)(D) to the customer C, who can decrypt using a private key Pr2(I,C), thus getting D=Pr2(I, C)(pu2(I,C)(D)).

As described above, if needed, before sending application A to the insurance entity I, the customer C will have visited one or more verifiers.

As mentioned previously, the link between the third party T and the insurance entity I can be made more secure by using the methods of Ref3 or by making it indirect as described above.

Methods for payments from the insurance entity I to the third party T or vice-versa are preferably performed as described above.

Preferred Embodiments for Customer-Purveyor Contacts:

Turning now to when C is a customer of the insurance entity I, it is described how insurance entity I can deal with customer C despite ignoring the identity of customer C.

Figure 4:
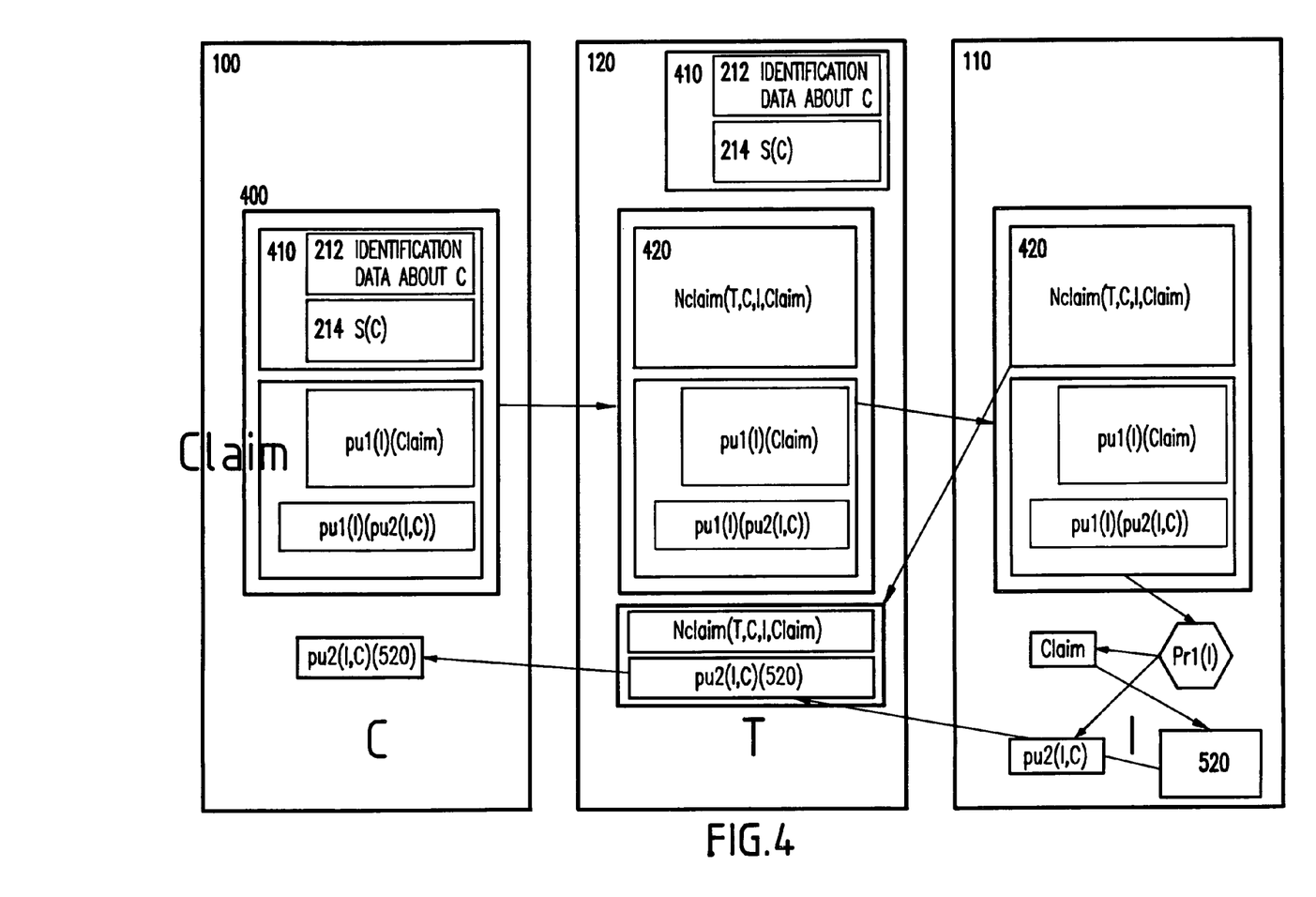
FIG. 4 schematically illustrates a transaction request (e.g., a "claim" in the example of an insurance scenario) processing flow of the application A between a customer (C) 100, insurance entity (I) 110, and a third party (T) 120, and more specifically a situation where customer C is a customer of the insurance entity and yet in which anonymity is preserved.

Referring to FIG. 4, when submitting a transaction such as a claim ("Claim") at 400, encrypted using pi1(I), customer C (100) will address it to third party T 120 (possibly after consulting with one or more verifiers Vj as needed). Third party T 120 transmits Claim to insurance entity I 110 after cutting off the heading 410 and attaching a number Nclaim (T,C,I,Claim) at 420. Insurance entity I then processes the Claim.

Then, insurance entity I 110 sends 520 which is a payment, or request for further data, or the declination of part or all of the claim, or a combination thereof and other similar content, an insurance entity I may transmit after or while processing a claim, all encrypted using public key pu2(I,C) to third party T 120. Third party T then transmits it to customer C 100.

Figures 5, 6:
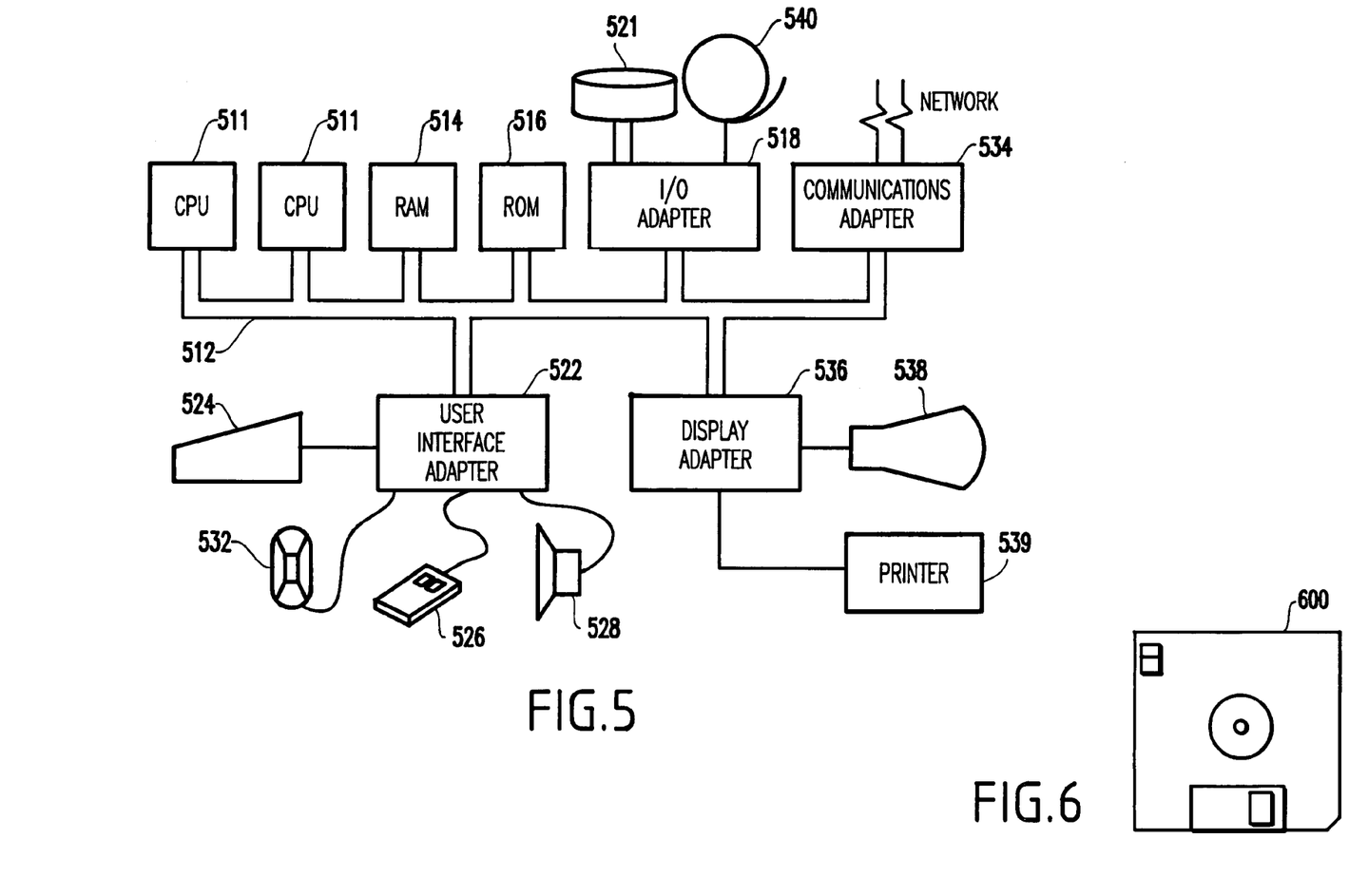
FIG. 5 illustrates an exemplary hardware/information handling system for incorporating the present invention therein.
FIG. 6 illustrates a signal bearing medium 600 (i.e., storage medium) for storing steps of a program of a method according to the present invention.

FIG. 5 illustrates a typical hardware configuration of an information handling/computer system in accordance with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539. As mentioned above, the printer 539 may be a digital printer or the like.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the diskette 600, the computer/CPU 511, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

With the unique and unobvious aspects of the present invention, a method and system are provided in which potential customers perceive (and are provided) an increased privacy and security associated with e-commerce.

Further, even with such increased privacy and security, businesses are still provided with some level of business intelligence (e.g., for marketing and related functions and for customer relationship management) surrounding a transaction. Thus, the analytic tools which have allowed better customer understanding and thereby better pricing, better customer service, etc., will continue to be advantageously used.

While a preferred embodiment of the present invention has been described above, it should be understood that it has been provided as an example only. Thus, those skilled in the art will recognize that the invention can be practiced with modification within the spirit and scope of the appended claims.

The invention claimed is:

1. A method of performing electronic commerce without a candidate customer being forced to disclose private data together with an identity of the candidate customer, to a business entity requiring said private data, said method comprising:

establishing an intermediary relationship with a third party between the candidate customer and the business entity;

providing a proprietary item to said customer such that the customer can be identified as a legitimate owner of the item without revealing the identity of said customer;

performing electronic commerce between said customer and said business entity through said third party, utilizing said proprietary item and a document; and replacing, by said third party, identification data of said candidate customer in said document with an identifier, and transmitting said document including said identifier to said business entity, such that an identity of said customer is kept from said business entity, wherein said business entity is provided with information identifying said customer as a transactional party in said electronic business transaction, wherein a Fourth Party delivers to the customer a portable device P(C) which carries biometrics of the customer such that the customer can be identified as a legitimate owner of the portable device P(C) without revealing the identity of said customer, wherein the device P(C) delivers a number S(C) at each transaction, and the number S(C) is readable from the portable device P(C) only in the presence of the customer, wherein said portable device P(C) generates numbers S(C,n), where n is an integer belonging to a set $\{1, 2, \ldots, N\}$, and wherein for at least one of a new business entity and another partner of the customer, a new number n is chosen for all further transactions between the customer and said at least one of said new business unit and said another partner.

2. A method of performing electronic commerce without a candidate customer being forced to disclose private data together with an identity of the candidate customer, to a business entity requiring said private data, said method comprising:

establishing an intermediary relationship with a third party between the candidate customer and the business entity;

providing a proprietary item to said customer such that the customer can be identified as a legitimate owner of the item without revealing the identity of said customer;

performing electronic commerce between said customer and said business entity through said third party, utilizing said proprietary item and a document; and replacing, by said third party, identification data of said candidate customer in said document with an identifier, and transmitting said document including said identifier to said business entity, such that an identity of said customer is kept from said business entity, wherein said business entity is provided with information identifying said customer as a transactional party in said electronic business transaction, wherein the business entity chooses a set of verifiers Vj, j=1, 2, . . . N, and wherein said verifiers are each equipped to verify portable devices, and are connectable to a network so as to output information to a third party T using privacy protection.

3. A method of performing electronic commerce without a candidate customer being forced to disclose private data together with an identity of the candidate customer, to a business entity requiring said private data, said method comprising:

establishing an intermediary relationship with a third party between the candidate customer and the business entity;

providing a proprietary item to said customer such that the customer can be identified as a legitimate owner of the item without revealing the identity of said customer;

performing electronic commerce between said customer and said business entity through said third party, utilizing said proprietary item and a document; and replacing, by said third party, identification data of said candidate customer in said document with an identifier, and transmitting said document including said identifier to said business entity, such that an identity of said customer is kept from said business entity, wherein said business entity is provided with information identifying said customer as a transactional party in said electronic business transaction, wherein said establishing an intermediary relationship includes sending by the customer to the third party said document to register with said business entity and software to encrypt the document using a public key pu1(I) included in a public signature scheme (Pr1(I), pu1(I)) of the business entity, said software further allowing the customer to compute a public signature scheme (Pr2(I,C),pu2(I,C)), and said document being provided over a network connected to said business entity.

4. The method according to claim 3, wherein the document comprises a header having identification data about the customer written together with a number S(C) associated with the proprietary item, and a body where personal or other data associated with said customer and pu2(I,C) are written after encryption using pu1(I).

5. The method according to claim 4, wherein when receiving the document, the third party replaces the header with a number N(T,C,I) which is sent to insurance entity with body of the completed document, wherein said business entity decrypts body and decides on an offer price if any, and wherein a decision is communicated to the business entity after encryption using pu2(I,C) together with N(T,C,I), and the business entity forwards pu2(I,C)(D) to the customer.

6. A method of performing electronic commerce without a candidate customer being forced to disclose private data together with an identity of the candidate customer, to a business entity requiring said private data, said method comprising:

establishing an intermediary relationship with a third party between the candidate customer and the business entity;

providing a proprietary item to said customer such that the customer can be identified as a legitimate owner of the item without revealing the identity of said customer;

performing electronic commerce between said customer and said business entity through said third party, utilizing said proprietary item and a document; and replacing, by said third party, identification data of said candidate customer in said document with an identifier, and transmitting said document including said identifier to said business entity, such that an identity of said customer is kept from said business entity, wherein said business entity is provided with information identifying said customer as a transactional party in said electronic commerce transaction, wherein, before establishing an intermediary relationship, the customer accesses one or more verifiers Vj, and wherein the customer identifies itself to each verifier Vj using a number S(C) associated with the proprietary item, and requests Vj to send S(C) to the business entity, together with data verified by Vj.

7. The method according to claim 6, wherein communication to the business entity is performed by appending to the number S(C) a non-identity data relevant to the customer encrypted using pu1(I).

8. The method according to claim 6, wherein a link between the third party and the business entity is provided by the third party posting one or more completed documents on a dedicated world-wide-web (WWW) page after replacing said identification data with said identifier, and wherein said identifier comprises a number N(T,C,I) which allows the business entity, but no other party, to recognize this number as a number associated with the business entity.

9. A method of selecting a purveyor of goods or services in a confidential manner over a network, comprising:

sending, by a customer to a third party, an application and software for encrypting the application using a public key pu1(I), wherein said application is taken electronically from a business entity, wherein a public signature scheme of said business entity is (Pr1(I),pu1(I)), software allowing the customer to compute a public signature scheme (Pr2(I,C),pu2(I,C)), and wherein said business entity is provided with information identifying said customer only as a transactional party in said electronic business transaction, wherein said third party replaces identification data of said customer with an identifier in said application which is transmitted to said business entity, wherein said method further comprises:

establishing a customer-purveyor contact over the network, said establishing comprising when submitting a transaction request, encrypted using pi1(I), the customer addresses the request to the third party, after selectively accessing one or more verifiers Vj;

transmitting, by the third party T, the transaction request to the business entity after removing a header and attaching a number Ntransaction(T,C, I,Transaction) thereto;

processing the request by the business entity;

sending, by the business entity, a communication to the third party;

transmitting said communication, after or while processing the transaction request, to the third party, said request being encrypted using the public key pu2(I,C); and transmitting, by the third party, the communication to the customer.

10. The method according to claim 9, wherein the application includes a header where said identification data is written together with a number S(C), and a body where other data of the customer and the key pu2(I,C) is written after encryption using the public key pu1(I).

11. The method according to claim 10, wherein when receiving the application, the third party replaces the header with said identifier which comprises a number N(T,C,I) which is sent to the business entity with the completed body of the application.

12. The method according to claim 11, wherein the business entity decrypts the body using Pr1(I)(pu1(DATA)) and makes a decision D on whether to proceed and if so, an offer price, and wherein the decision D is communicated to the third party after encryption using public key pu2(I,C) together with the number N(T,C,I), and wherein the third party, using the number N(T,C,I) to recognize the customer, sends the public key pu2(I,C) (D) to the customer, who decrypts using a private key Pr2(I,C) to obtain D=Pr2(I,C)(pu2(I,C)(D)).

13. The method according to claim 9, wherein before sending said application to the business entity, the customer accesses one or more verifiers.

14. The method according to claim 9, wherein the communication includes one of a payment, a request for further data, and a declination of part or all of the transaction.

* * * * *